United States Patent Office 2,988,449
Patented June 13, 1961

2,988,449
ENZYMATIC FEEDSTUFFS
Clifford M. Hollenbeck, Manitowoc, Wis., assignor to Wisconsin Malting Co., Milwaukee, Wis., a corporation of Wisconsin
No Drawing. Filed Dec. 4, 1957, Ser. No. 700,552
3 Claims. (Cl. 99—4)

This invention relates to up-grading feeds through the addition of enzymes and particularly to the up-grading of fibrous grain feeds through the addition of cytolytic enzymes. While the following description is directed primarily to barley used as poultry feed, it will be appreciated this invention is applicable to other fibrous grain feeds and may be used other than as poultry feed.

The most common grain feed for poultry is corn. Since corn is highly efficient in metabolizable energy it generally represents the basic carbohydrate source in poultry feeds. There are certain areas in the United States and other countries where corn, for one reason or another, is not a major field crop and if it is used as the basic carbohydrate source in feedstuffs, the cost is correspondingly high. In many of these high cost corn areas, barley is plentiful and correspondingly relatively less costly than corn. It has been attractive to the feed industry, especially the poultry feed industry, in these areas to utilize barley as much as possible in their feed formulas. Barley, however, does not give as good a feed efficiency in poultry as corn. For example, the metabolizable energy values of these grains are as follows (Morrison, Feeds and Feeding, 22nd edition, pg. 1146):

*Calories per pound*

Corn _____ 1,550
Barley _____ 1,320

Based on the average composition of barley the metabolizable energy of barley should be about 1,500 calories per pound and thus, nearer to that of corn. There have been explanations for the lower feeding efficiency for barley such as interference in digestion by the fibrous hulls etc., but none of these explanations have proven conclusive. Recent studies have shown that the value of barley is improved in terms of feed efficiency or metabolizable energy for poultry, if it is first steeped in water or supplemented with enzymes. This work was performed and announced by investigators at Washington State College in April 1957 (References: Feedstuffs, 29, April 20th, pg. 1, 1957; Jensen et al., Proc. Soc. Exp. Biol. and Med. 95, June, pg. 249, 1957; Poultry Science 36, July, pg. 919, 1957; Feedstuffs, 29, October 5, pg. 28, 1957).

Hastings (Poultry Science 25, pg. 584, 1946) found earlier that the addition of a diastatic enzyme material (mold bran) to a high fiber containing chicken feed including milling by-products, improved growth and feed efficiency. The enzymatic material did not improve feeds with relatively low fiber content.

In all of the investigations for up-grading the value of barley or other fibrous grain materials in poultry feed by the use of enzymes, the enzymes used have been derived from the growth of molds or bacteria. For example, Jensen et al. used an enzyme preparation known as Clarase or Takadiastase derived from the growth of mold. Hastings also used a crude product derived by growth of molds on steamed wheat bran. McGinnis disclosed the use of an alpha-amylase product derived from a bacterial fermentation. Furthermore, McGinnis states "Here it was found that only Clarase and alpha-amylase (bacterial origin) were effective in promoting growth and feed efficiency. Pan-creation and malt diastase were inactive." (Feedstuffs 29, pg. 28 (Oct. 5), 1957.)

Contrary to previous disclosures, I have found that diastatic barley malt is effective as an enzyme supplement in up-grading the value of barley for poultry feed. Furthermore, I have found that the effectiveness of these enzyme supplements is not due solely to alpha-amylase as it has been generally attributed. Rather, I have found the effectiveness of malt in improving the efficiency of barley correlates very well with the content and activity of the cytolytic enzymes in the malt (often referred to as cytases, gumases or beta-polyglucosidases). Apparently, therefore, the malt diastase used by McGinnis had lost or was made by a process which destroyed the cytolytic enzyme activity.

The mechanism of the action of enzymes in up-grading barley in poultry feed is not known. However, it is well known that barley contains non-starch carbohydrate material known as beta-polyglucosides and/or polypentosides and commonly referred to as gums. It is also known that the usual digestive enzymes do not attack these gums and degrade them into metabolizable sugars. The cytases of malt and other enzyme sources, however, react with the barley gums and cleave them into sugars which are metabolizable. The degradation of the barley gums to sugars and thereby increasing the metabolizable energy values could, therefore, be the mechanism of the enzyme effect on barley in poultry feeds.

The novelty of my invention is the discovery that malt effectively up-grades the metabolizable value of barley in poultry feed and that this up-grading process is dependent upon the barley gum degrading enzyme content of the malt.

I have measured the amylolytic and cytolytic activities and found that only the cytolytic activity correlates with the increased feed efficiency of barley in poultry rations supplemented with malt. Examples of the relative enzyme activities and barley up-grading efficiencies in feeds of 5 different samples of malt are shown in Table I. The data in Table I show that the growth efficiency does not correlate with alpha-amylase or with total amylase activity (diastatic power) but does correlate with cytolase activity.

TABLE I

| Malt Sample | Relative Enzyme Activity of Malt Samples [1] | | | |
|---|---|---|---|---|
| | Diastatic [2] Activity, (Percent) | Alpha [3] Amylase Activity, (Percent) | Cytolytic [3] Activity, (Percent) | Feed [4] Efficiency, (Percent) |
| 1 | 80 | 71 | 100 | 100 |
| 2 | 75 | 100 | 100 | 100 |
| 3 | 100 | 86 | 92 | 70 |
| 4 | 34 | 53 | 72 | 50 |
| 5 | 10 | 85 | 88 | 60 |
| 6 | 76 | 80 | 85 | 60 |

[1] Relative activities based on the most active at 100%.
[2] Cereal Laboratory Methods, fifth edition, pp. 94-98.
[3] Twenty four grams of ground barley and 1 g. of ground malt are mashed at 38° C. in 200 ml. of water. Replicate samples are started at spaced time intervals. The reaction is stopped at predetermined time intervals by the addition of 25 ml. of 40% trichloroacetic acid solution. The mixtures are then heated to 72° C., with stirring, dispersed while hot in a Waring Blendor (3 minutes) and then cooled in running cold water. The cold suspension is centrifuged, the supernatant decanted thru cheese cloth, and the viscosity of the clear extracts determined. The relative rate of viscosity lowering is a measure of cytolytic activity.
[4] Calculated using average weekly growth gains and based on the largest gain being 100%.

The actual growth response of chickens on rations comprising 60% barley with and without various levels of malt are shown in Table II. The data in Table II indicate that the optimum range of malt usage is from about 0.5% to about 5.0% based on the finished feed or from about 1.0% to about 8.0% based on the barley component of the feed. The upper level of this range under the conditions of our feeding tests is indicated by the observation that the 4.8% level of malt was little, if any, better than the 2.4% level.

TABLE II

*Chick growth response with various levels of malt*

| Malt Level (Percent Total Ration)[1] | Average Weight in Grams (20 Chicks per group)—Weeks Age | | |
|---|---|---|---|
| | 2 | 4 | 6 |
| 0.0 | 130 | 314 | 576 |
| 0.6 | 128 | 331 | 620 |
| 1.2 | 129 | 337 | 647 |
| 2.4 | 135 | 340 | 662 |
| 4.8 | 143 | 338 | 665 |

[1] Ration comprised 40% basal mixture of alfalfa leaf meal, soya bean meal, bone meal, granite grits, limestone, iodized salt, fish meal and a vitamin mineral mixture and 60% barley plus malt adjunct.

One of the major factors determining the value of malt for this use as mentioned above is its cytolytic activity. The cytolytic activity of malt depends upon several things, among which is the type of barley used in the manufacture of the malt. The data in Table III show the relative effectiveness of malts prepared in identical manner, from the various types of barley. Of the types tested in our experimentation, Midwestern, 6-row white and Canadian, 6-row, blue barleys appear to produce malt with higher cytolytic activity, thus are more valuable in producing malt for use in feeds than some of the other varieties, such as Northwestern, 2-row, white or Western 6-row blue types.

TABLE III

*Relative growth promoting activity of malts from different types of barley*

| Type of Barley | Variety[1] Example | Average Weight in Grams[2] (20 Chicks per group)—Weeks Age | |
|---|---|---|---|
| | | 2 | 4 |
| Midwestern, 6-row, white | Kindred | 135 | 340 |
| Canadian, 6-row, blue | Olli | 133 | 347 |
| Northwestern, 2-row, white | Hanna | 136 | 327 |
| Western, 6-row, white | Atlas | 135 | 328 |

[1] The malts were prepared from the barleys by the usual malting technique of 6 days germination, and drying at about 125° F.
[2] The malt was included in the ration (60% barley) at the level of 2.4%.

Although improving the feed efficiency of barley only is illustrated in the foregoing, it should be understood that this invention is to include any feedstuff material containing gum-like substances which can be degraded by malt enzymes. For example, it is known that malt enzymes degrade the gummy constituents of oats. Furthermore, even corn contains some non-starch carbohydrate material which can be degraded with cytolytic enzymes.

I have found that the addition of about 2.4% malt to a poultry ration comprised of 60% corn improved the growth rate of chickens over that of the same ration without the malt. These growth data are shown in Table IV.

TABLE IV

*Growth improvement with malt in a corn ration*

| Malt Level (Percent Total Ration) | Average Weight in Grams (20 Chicks per group)—Weeks Age | | |
|---|---|---|---|
| | 1 | 3 | 6 |
| 0.0 | 78 | 229 | 669 |
| 2.4 | 81 | 232 | 679 |

It should also be understood that this invention applies to the improvement of feedstuffs containing gum-like substances for animals as well as poultry. In other words, whenever a feed or food can be improved in increased metabolizable energy from degradation of non-starch carbohydrate constituents by malt, the process falls within the scope of this invention.

From the above it will be noted that, while contrary to prior studies malt can be used to up-grade feeds, the usefulness of malt is related to the cytolytic enzyme content and activity of the malt rather than to alpha-amylase and total amylase activity. I also found the proper range of malt level (.5 to 5%—Table II) for economic and appreciable up-grading of the feed. Finally, I find certain types of barley produce malt with higher cytolytic activity and are, therefore, more valuable in producing malt for feed supplement use.

Further study in this field may demonstrate various changes or deviations from the above are practical and for this reason this invention is to be limited only by the scope of the claims.

I claim:
1. A dry poultry feed containing high fibre content unmalted barley and 1 to 8% malt based on the barley content of the feed, the malt being high in cytolytic enzyme content and activity.
2. A high fibre content dry poultry feed containing malt prepared from Midwestern, 6-row-white aleurone barley.
3. A high fibre content dry poultry feed containing malt prepared from Canadian, 6-row-blue aleurone barley.

References Cited in the file of this patent

UNITED STATES PATENTS 1,885,411    Brown _____ Nov. 1, 1932

OTHER REFERENCES

Hastings: Poultry Science 25 (1946), pages 584–6.